(No Model.) 2 Sheets—Sheet 1.

A. H. CARSON.
FRUIT DRIER.

No. 503,899. Patented Aug. 22, 1893.

Witnesses
Inventor
A. H. Carson,
By Whitman & Wilkinson
Attorneys

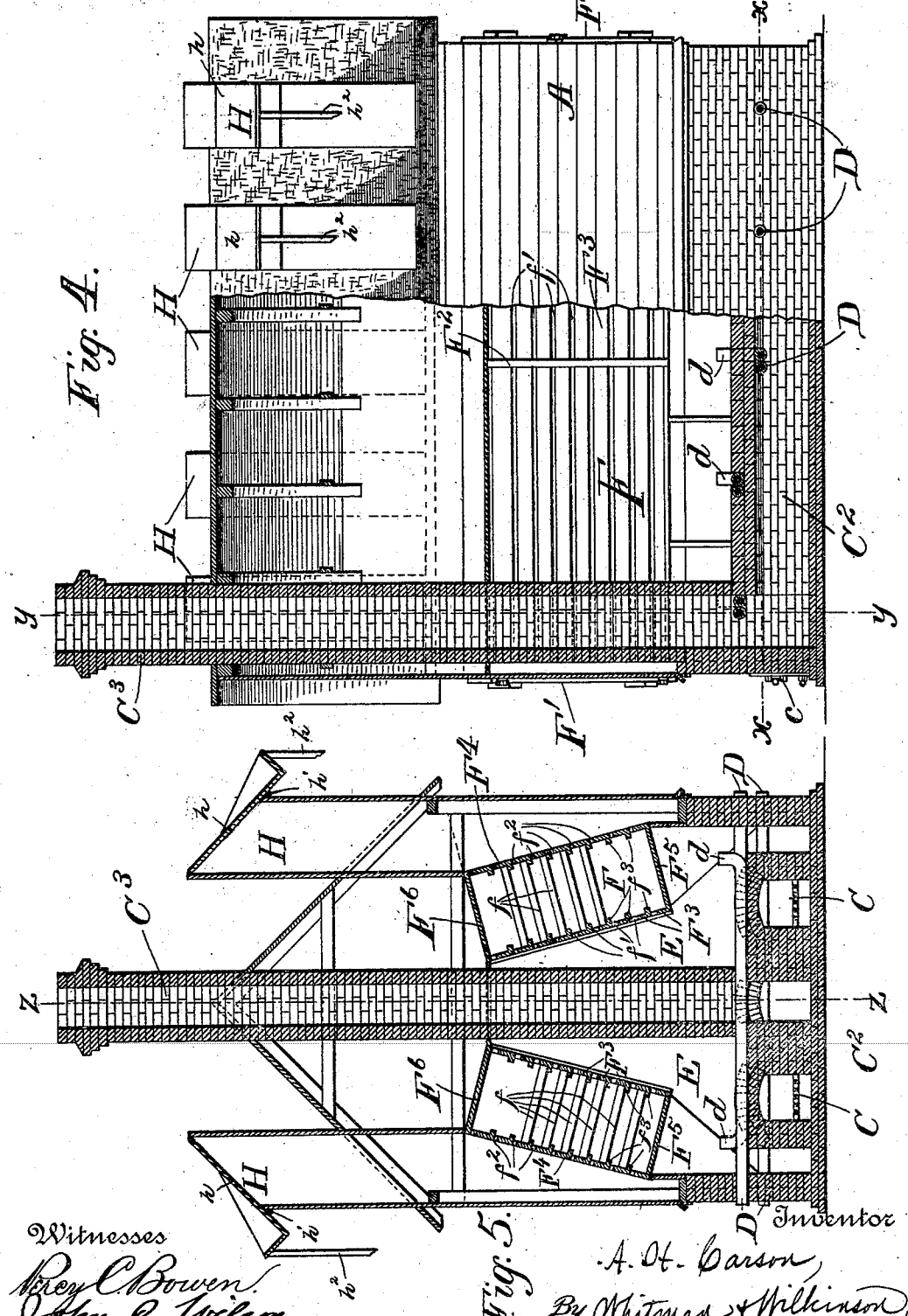

UNITED STATES PATENT OFFICE.

ALFRED H. CARSON, OF GRANT'S PASS, OREGON.

FRUIT-DRIER.

SPECIFICATION forming part of Letters Patent No. 503,899, dated August 22, 1893.

Application filed January 19, 1893. Serial No. 458,960. (No model.)

*To all whom it may concern:*

Be it known that I, ALFRED H. CARSON, a citizen of the United States, residing at Grant's Pass, in the county of Josephine and State of Oregon, have invented certain new and useful Improvements in Fruit-Driers; and I do hereby declare the following to be a full, clear, and exact description of the invention, such as will enable others skilled in the art to which it appertains to make and use the same.

My invention relates to improvements in fruit driers and it consists of certain novel features hereinafter described and claimed.

Reference is had to the accompanying drawings in which the same parts are indicated by the same letters throughout the several views.

Figure 2:
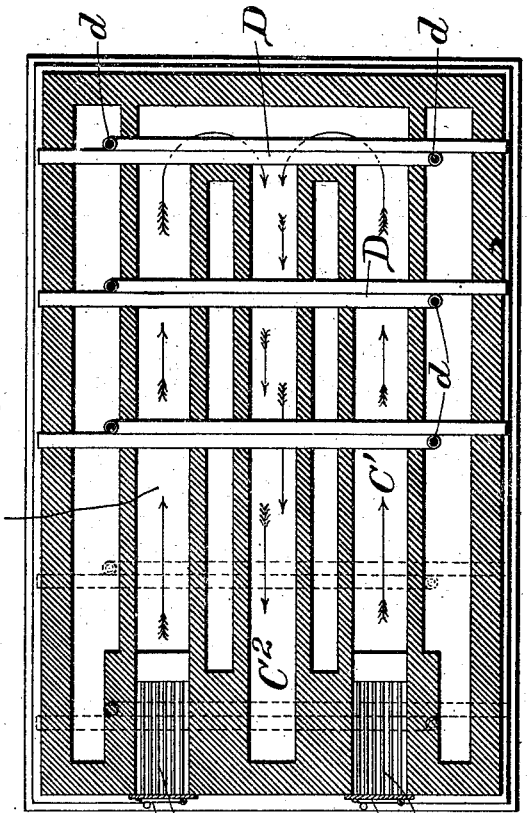
Figure 3:
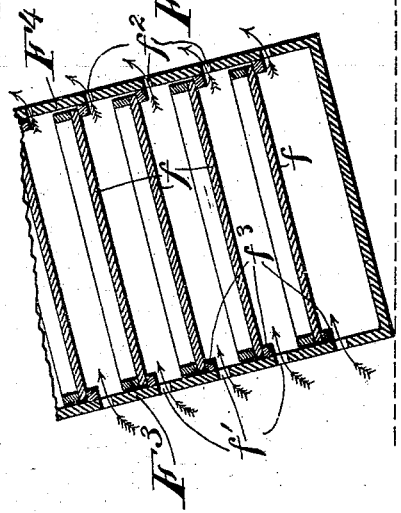
Figure 1:
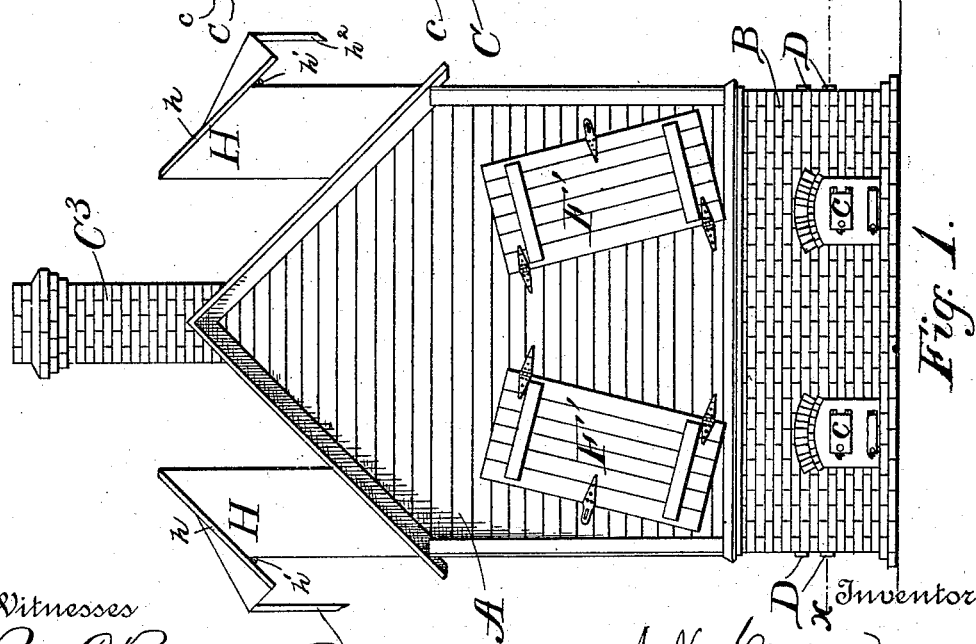

Figure 1 represents a front view of the exterior of the fruit-drier. Fig. 2 represents a section along the line $x\,x$ of Figs. 1 and 4, looking down. Fig. 3 represents an enlarged section of several of the fruit trays and of a portion of a chamber holding the same. Fig. 4 represents a side elevation and a central vertical section of the improved fruit drier; and Fig. 5 represents a transverse section along the line $y\,y$ of Fig. 4.

A represents a house of suitable construction mounted on the masonry foundation B which incloses the two furnaces C, and the passages for the product of combustion C, $C^2$, connected to the chimney $C^3$.

$c$ represents the fire-doors for feeding the fuel into the furnace.

D represents air pipes connected to the outer air through the sides of the furnace, and bent upward at $d$ so as to open into the hot-air chamber D. These pipes, which may be multiplied indefinitely pass over and through the heated products of combustion and the air which rushes through them becomes highly heated before it enters the chamber E. In this chamber a longitudinal box F is placed inclined as shown in Fig. 5, and forming a compartment separating the hot air chamber E from the up-takes H. This box F is provided with guides $f^3$ on which slide the fruit trays $f$ made preferably of wire. The sloping walls $F^3$ and $F^4$ are provided with apertures $f'$ and $f^2$ above each fruit tray, through which the hot air passes in a flat stream above one tray and beneath the next, from the chamber E to the up-take H. The inner apertures $f'$ are preferably made somewhat larger than the larger apertures $f^2$, in order that the hot air may enter into the chamber F more freely than it departs therefrom, or in other words so that its motion may be checked while in the box F, and thus the fruit may be exposed for a longer time to the drying effect of the hot air. The top and bottom $F^5$ and $F^6$ of the chamber are made continuous, so that all the air coming in through the pipes D must find its way up through the apertures $f'$ and $f^2$ and between the trays before reaching the up takes H. This up-take is provided with combined sheds and dampers $h$, hinged at $h'$ and operated by the rods or ropes $h^2$, parts of which only are shown in the drawings. These sloping sheds keep the up-takes closed when the drier is not in use and may be lifted more or less to allow the heated air to escape.

For convenience in handling the trays, the drying chamber F is provided at either end with a door F' fitting snugly, while a stop $F^2$ is provided to prevent the trays from being slid in too far from either end.

The operation of the device is as follows:— The fruit is placed in the trays, and the trays are slid into place, and the doors closed. Fires being kindled in the hearths C, the products of combustion move through the passages C' and $C^2$ up the chimney $C^3$. At the same time, the cold air coming from the exterior of the drier through the pipes D becomes heated as it passes over the furnace, and when it reaches the upward projecting portions $d$ is delivered into the hot air chamber E. From the chamber E it passes through the apertures $f'$ into the chamber F between and among the trays, and carrying off the moisture of the fruit with it, it passes through the smaller apertures $f^2$ into the up-take H. Should the trays in one section of the box F contain larger fruit than the trays in another section thereof, the damper of the uptake adjacent to the second section should be wholly or partially closed so as to cause the larger portion of the heated air to pass over the trays of the first section and out through the uptake adjacent thereto. It will thus be seen that nothing but pure, dry air enters into the chamber E and into the chamber F containing the fruit, and that the said air passes in thin streams over and under the fruit trays on which the fruit is placed in a thin layer. In this manner the fruit is uniformly, thoroughly, and rapidly dried.

It will be seen that the apparatus is entirely dependent upon natural drafts, and that there is no tendency to have the draft in one part of the apparatus greater than that in another, as would be almost unavoidable with forced drafts.

The device thus furnishes a cheap and convenient means of drying fruit.

Having thus described my invention, what I claim, and desire to procure by Letters Patent of the United States, is—

In a fruit drier, the combination with a furnace, and with the chimney $C^3$, therefor, a hot air chamber E located above the said furnace and around the said chimney, a fruit drying chamber F contained in the said hot air chamber on each side of the chimney therein, the said drying chamber having apertured sides and being inclined within the said hot air chamber, and forming separate compartments in the upper corners thereof, hot-air pipes D heated by the said furnace and entering the body of said hot air chamber, below the drying chambers; ranges of trays contained in the said drying chamber between the apertures therein; a series of uptakes connected with the said separate compartments adjacent to the various trays contained in the drying chamber and a damper for each of the said uptakes, substantially as described.

In testimony whereof I affix my signature in presence of two witnesses.

ALFRED H. CARSON.

Witnesses:
W. A. HOOD,
M. C. H. DAY.